(12) United States Patent
Reams

(10) Patent No.: US 8,082,455 B2
(45) Date of Patent: Dec. 20, 2011

(54) SYSTEMS AND METHODS FOR CONTROLLING THE POWER STATE OF REMOTE CONTROL ELECTRONICS

(75) Inventor: William R. Reams, Englewood, CO (US)

(73) Assignee: EchoStar Technologies L.L.C., Englewood, CO (US)

( * ) Notice: Subject to any disclaimer, the term of this patent is extended or adjusted under 35 U.S.C. 154(b) by 592 days.

(21) Appl. No.: 12/056,520

(22) Filed: Mar. 27, 2008

(65) Prior Publication Data

US 2009/0249086 A1    Oct. 1, 2009

(51) Int. Cl.
*G06F 1/00* (2006.01)
(52) U.S. Cl. .................................................. 713/300
(58) Field of Classification Search .................. 713/300
See application file for complete search history.

(56) References Cited

U.S. PATENT DOCUMENTS

| | | |
|---|---|---|
| 4,067,000 A | 1/1978 | Carlson |
| 4,231,026 A | 10/1980 | Sullivan |
| 4,578,671 A | 3/1986 | Flowers |
| 4,598,243 A | 7/1986 | Kawakami |
| 5,115,236 A | 5/1992 | Kohler |
| 5,164,652 A | 11/1992 | Johnson |
| 5,204,657 A | 4/1993 | Prosser |
| 5,294,915 A | 3/1994 | Owen |
| 5,455,560 A | 10/1995 | Owen |
| 5,506,572 A | 4/1996 | Hills |
| 5,519,760 A | 5/1996 | Borkowski |
| 5,583,491 A | 12/1996 | Kim |
| 5,598,143 A | 1/1997 | Went |
| 5,638,050 A | 6/1997 | Sacca |
| 5,684,471 A | 11/1997 | Bernardi et al. |
| 5,705,997 A | 1/1998 | Park |
| 5,926,090 A | 7/1999 | Taylor |
| 5,945,918 A | 8/1999 | McGonigal |
| 5,963,010 A | 10/1999 | Hayashi |
| 5,990,868 A | 11/1999 | Frederick |

(Continued)

FOREIGN PATENT DOCUMENTS

EP    1 435 563    7/2004

(Continued)

OTHER PUBLICATIONS

International Search Report dated Jul. 20, 2009, PCT/US2009/037856, 2 pages. Osoinach, Bryce, "Proximity Capacitive Sensor Technology for Touch Sensing Applications," Proximity Sensing White Paper prepared for Freescale Semiconductor, Inc., Tempe, Arizona, 2007, 12 pages.

(Continued)

*Primary Examiner* — Mohammed Rehman
(74) *Attorney, Agent, or Firm* — Dorsey & Whitney LLP

(57) ABSTRACT

A remote control device may include circuitry configured to receive user input to wirelessly control an electronic device, a power source electrically coupled to provide power to the circuitry, and a power state controller configured to control a power state of the circuitry based on a state of the electronic device. An electronic device may be configured to be controlled by a remote control device, and may include an input device configured to receive a wireless signal from the remote control device, an output device configured to send a wireless signal to the remote control device, and a processor coupled to the input device. The processor may be configured to control a function of the electronic device based on the received signal, to determine information regarding the state of the electronic device, and to send the determined information regarding the state of the electronic device to the remote control device.

10 Claims, 3 Drawing Sheets

U.S. PATENT DOCUMENTS

| | | | |
|---|---|---|---|
| 5,999,799 | A | 12/1999 | Hu |
| 6,002,450 | A | 12/1999 | Darbee |
| 6,191,551 | B1 | 2/2001 | Fischer |
| 6,230,277 | B1 | 5/2001 | Nakaoka et al. |
| 6,295,002 | B1 | 9/2001 | Fukuda |
| 6,373,256 | B1 | 4/2002 | Hanjani |
| 6,407,779 | B1 | 6/2002 | Herz |
| 6,449,726 | B1 | 9/2002 | Smith |
| 6,535,125 | B2 | 3/2003 | Trivett |
| 6,573,832 | B1 | 6/2003 | Fugere-Ramirez |
| 6,633,281 | B2 | 10/2003 | Lin et al. |
| 6,664,744 | B2 | 12/2003 | Dietz |
| 6,725,064 | B1 | 4/2004 | Wakamatsu |
| 6,771,182 | B1 | 8/2004 | Loh et al. |
| 6,791,467 | B1 * | 9/2004 | Ben-Ze'ev .............. 340/825.69 |
| 6,938,101 | B2 | 8/2005 | Hayes |
| 6,985,069 | B2 | 1/2006 | Marmaropoulos |
| 7,009,528 | B2 | 3/2006 | Griep |
| 7,047,333 | B2 * | 5/2006 | Leung et al. ................. 710/100 |
| 7,362,227 | B2 | 4/2008 | Kim |
| 7,411,631 | B1 | 8/2008 | Joshi et al. |
| 7,474,248 | B2 | 1/2009 | Nakamura et al. |
| 7,738,792 | B2 | 6/2010 | Flachs et al. |
| 7,757,105 | B2 | 7/2010 | Okazaki |
| 7,852,255 | B2 | 12/2010 | Rapisarda |
| 7,907,060 | B2 | 3/2011 | Reams |
| 8,009,054 | B2 | 8/2011 | Reams |
| 2002/0085128 | A1 | 7/2002 | Stefanik |
| 2002/0093481 | A1 | 7/2002 | Kehlstadt |
| 2003/0026424 | A1 | 2/2003 | McGarrahan |
| 2003/0035074 | A1 | 2/2003 | Dubil |
| 2003/0145242 | A1 | 7/2003 | Derocher et al. |
| 2004/0096051 | A1 * | 5/2004 | Kim et al. ................ 379/373.01 |
| 2004/0148632 | A1 | 7/2004 | Park |
| 2004/0161031 | A1 | 8/2004 | Kwentus |
| 2004/0203374 | A1 | 10/2004 | Zilliacus |
| 2004/0235446 | A1 | 11/2004 | Flaherty |
| 2004/0250273 | A1 | 12/2004 | Swix |
| 2004/0252247 | A1 | 12/2004 | Wabiszczewicz |
| 2005/0033887 | A1 | 2/2005 | Kim et al. |
| 2005/0073497 | A1 | 4/2005 | Kim |
| 2005/0146438 | A1 | 7/2005 | Giger |
| 2006/0017581 | A1 | 1/2006 | Scwendinger |
| 2006/0034611 | A1 | 2/2006 | Li |
| 2006/0081771 | A1 | 4/2006 | Eliad |
| 2007/0018845 | A1 | 1/2007 | Sutardja |
| 2007/0080823 | A1 | 4/2007 | Fu |
| 2007/0130609 | A1 * | 6/2007 | Han et al. ...................... 725/132 |
| 2007/0185968 | A1 | 8/2007 | White |
| 2007/0279332 | A1 | 12/2007 | Fryer et al. |
| 2008/0040758 | A1 | 2/2008 | Beetcher et al. |
| 2008/0098426 | A1 | 4/2008 | Candelore |
| 2008/0163049 | A1 | 7/2008 | Krampf |
| 2008/0267435 | A1 | 10/2008 | Schumaier |
| 2008/0312852 | A1 | 12/2008 | Maack |
| 2009/0002218 | A1 | 1/2009 | Rigazio et al. |
| 2009/0122206 | A1 | 5/2009 | Jun |
| 2009/0174653 | A1 | 7/2009 | Shin et al. |
| 2009/0241052 | A1 * | 9/2009 | Ha et al. ......................... 715/772 |
| 2009/0243909 | A1 | 10/2009 | Reams |
| 2009/0262254 | A1 | 10/2009 | Reams |
| 2009/0278701 | A1 | 11/2009 | Reams |
| 2009/0303097 | A1 | 12/2009 | Reams |
| 2009/0322583 | A1 | 12/2009 | Reams |
| 2010/0013551 | A1 | 1/2010 | Reams |

FOREIGN PATENT DOCUMENTS

| | | |
|---|---|---|
| EP | 1617315 | 1/2006 |
| EP | 1 884 869 | 2/2008 |
| GB | 2331610 | 5/1999 |
| GB | 2347592 | 9/2000 |
| GB | 2 398 138 | 8/2004 |
| JP | 01114298 | 5/1989 |
| JP | 04148499 | 5/1992 |
| JP | 10334380 | 12/1998 |
| JP | 00130848 | 5/2000 |
| JP | 2001-268658 A * | 9/2001 |
| JP | 04092946 | 3/2004 |
| JP | 06020386 | 1/2006 |
| JP | 08-028584 | 2/2008 |
| KR | 2009-0047831 | 5/2009 |
| WO | WO 2007/023437 | 3/2007 |
| WO | WO 2007/086633 | 8/2007 |
| WO | WO 2008/146095 | 12/2008 |

OTHER PUBLICATIONS

Reams, William, U.S. Appl. No. 12/056,819, filed Mar. 27, 2008 entitled "Reduction of Power Consumption in Remote Control Electronics".

Reams, William, et al, U.S. Appl. No. 12/135,370, filed Jun. 9, 2008 entitled "Systems, Methods and Apparatus for Changing an Operational Mode of a Remote Control".

Reams, William, et al, U.S. Appl. No. 12/175,897, filed Jul. 18, 2008 entitled "Systems and Methods for Controlling Power Consumption in Electronic Devices".

Reams, William, et al, U.S. Appl. No. 12/404,848, filed Mar. 16, 2009 entitled "Backlighting Remote Controls".

International Search Report dated Jun. 24, 2009, PCT/US2009/037871, 4 pages.

International Search Report dated Jul. 8, 2009, PCT/US2009/042651, 5 pages.

International Search Report dated Aug. 27, 2009, PST/US2009/044302, 3 pages.

International Search Report dated May 26, 2010, PCT/US2010/026694, 4 pages.

International Search Report dated Jul. 2, 2009, PCT/US2009/039948, 5 pages.

Preliminary Amendment dated Sep. 15, 2010, U.S. Appl. No. 12/056,819, 5 pages.

Office Action dated Jun. 25, 2010, U.S. Appl. No. 12/177,628, 20 pages.

Amendment and Response to Office Action dated Oct. 25, 2010, U.S. Appl. No. 12/177,628, 20 pages.

Notice of Allowance and Fee(s) Due dated Jan. 6, 2011, U.S. Appl. No. 12/177,628, 12 pages.

Office Action dated Apr. 16, 2008, U.S. Appl. No. 12/104,291, 18 pages.

Amendment and Response to Office Action dated Oct. 25, 2010, U.S. Appl. No. 12/104,291, 21 pages.

Final Office Action dated Jan. 6, 2011, U.S. Appl. No. 12/104,291, 18 pages.

Office Action dated Feb. 14, 2011, U.S. Appl. No. 12/135,370, 22 pages.

Office Action dated Mar. 3, 2011, U.S. Appl. No. 12/404,848, 11 pages.

Amendment and Response to Final Office Action and Terminal Disclaimer dated Mar. 7, 2011, U.S. Appl. No. 12/104,291 15 pages.

Japanese Office Action dated Mar. 8, 2011, JP 02011-501939, 3 pages.

Amendment and Response to Office Action dated Apr. 19, 2011, U.S. Appl. No. 12/135,370, 15 pages.

Amendment and Response to Office Action dated May 20, 2011, U.S. Appl. No. 12/404,848, 12 pages.

Notice of Allowance dated May 3, 2011, U.S. Appl. No. 12/104,291, 8 pages.

European Office Action dated Jul. 4, 2011, EP 09726361.0, 4 pages.

Final Office Action dated Jun. 9, 2011, U.S. Appl. No. 12/135,370, 22 pages.

Amendment and Response to Office Action dated Aug. 5, 2011, U.S. Appl. No. 12/135,370, 14 pages.

Request for Continued Examination dated Sep. 7, 2011, U.S. Appl. No. 12/135,370, 1 page.

Office Action dated Oct. 26, 2011, U.S. Appl. No. 12/135,370, 29 pages.

Office Action dated Oct. 7, 2011, U.S. Appl. No. 12/175,897, 11 pages.

* cited by examiner

SYSTEMS AND METHODS FOR CONTROLLING THE POWER STATE OF REMOTE CONTROL ELECTRONICS

CROSS-REFERENCE TO RELATED APPLICATION

This application is related to U.S. Nonprovisional patent application Ser. No. 12/056,819, entitled "Reduction of Power Consumption in Remote Control Electronics," filed on Mar. 27, 2008, which is hereby incorporated by reference in its entirety.

FIELD OF THE INVENTION

The present invention relates generally to remote control electronics, and more particularly to systems and methods for controlling the power state of remote control electronics.

BACKGROUND ART

Advancements in consumer electronic devices have led to a wide variety of such devices that may be operated remotely, i.e., at a distance from the device, using an associated remote control. Moreover, universal and learning remote controls have been developed to allow a user to operate one or more devices remotely using a single remote control and/or to replace one or more remote controls.

Most remote controls are hand-held devices that provide a user interface, such as a keypad, touchpad, etc., for a user to select various functions of the corresponding device or devices to be controlled. Also, most remote controls are wireless, battery-powered devices to facilitate their portability to locations from which the user may wish to control the corresponding device(s), although some wired remote controls exist. Common wireless remote controls are configured to communicate with the device(s) to be controlled via various known wireless modes, such as infrared, radiowave, etc.

The complexity of remote controls has increased along with the increased complexity of the devices that are controlled. Consumer demand has driven such complexity, at least in part, as users expect substantial or complete functionality of controlled devices via the associated remote control.

BRIEF SUMMARY

The increased complexity and functionality in remote controls has an associated increase in power consumption in such devices. However, it may be undesirable to increase the size and/or weight of remote controls to accommodate larger batteries, and also may be undesirable to employ more costly battery options that may provide the necessary power with longer battery life.

Thus, various systems and methods disclosed herein may control the power state of remote control electronics to reduce power consumption. For example, various systems and methods described herein may selectively place one or more potions of the electronics of a remote control into a stand-by (i.e., low-power) or an off power state. In various embodiments, the power state(s) of portion(s) of the remote control electronics may be controlled based on the state of the associated device, i.e., the device to be controlled using the portion(s) of the remote control.

One embodiment may take the form of a remote control device. The remote control device may comprise: circuitry configured to receive user input to wirelessly control at least one electronic device; a power source electrically coupled to provide power to the circuitry; and a power state controller configured to control a power state of the circuitry based on a state of the at least one electronic device. In some embodiments, the power state controller may be configured to place at least a portion of the circuitry into at least one of a stand-by or an off power state when a corresponding controlled portion of the at least one electronic device is not in use.

In some embodiments, the circuitry configured to receive user input may include circuitry to wirelessly control a main electronic device and circuitry to wirelessly control at least one auxiliary electronic device, and the power state controller may be configured to control a power state of the circuitry to control the main electronic device based on a state of the main electronic device and to control a power state of the circuitry to control the at least auxiliary electronic device based on a state of the at least one auxiliary electronic device.

In some embodiments, the power state controller may be configured to obtain information regarding the state of at least one electronic device by polling the electronic device(s) for information regarding the state of the electronic device(s). In such embodiments, the power state controller may be configured to poll at least one electronic device for information regarding the state of the electronic device(s) at least when a portion of the circuitry is in at least one of a stand-by or an off power state. The power state controller may be configured to poll at least one electronic device periodically. Alternatively or additionally, the power state controller may be configured to poll at least one electronic device at least when the remote control device is contacted by a user.

Another embodiment may take the form of an electronic device configured to be controlled by a remote control device. The electronic device may comprise: an input device configured to receive at least one wireless signal from the remote control device; an output device configured to send at least one wireless signal to the remote control device; and a processor coupled to the input device, configured to control at least one function of the electronic device based on the at least one wireless signal received by the input device, configured to determine information regarding the state of the electronic device, and configured to send the determined information regarding the state of the electronic device to the remote control device via the output device. In some embodiments, the processor may be configured to determine information regarding the states of a plurality of functions of the electronic device.

In some embodiments, the electronic device may further comprise at least one auxiliary input device coupled to the processor and configured to receive information regarding the state of an auxiliary device coupled to the auxiliary input device. In such embodiments, the processor may be configured to send the information regarding the state of the auxiliary device to the remote control device via the output device.

In some embodiments, the electronic device may be configured to be controlled by a plurality of remote control devices that are configured to control respective auxiliary devices. In such embodiments, the electronic device may include a plurality of auxiliary input devices coupled to the processor and configured to receive information regarding the state of the respective auxiliary devices coupled to corresponding ones of the auxiliary input devices. Further, the processor may be configured to send the information regarding the state of the respective auxiliary devices to the respective remote control devices via the output device.

Another embodiment may take the form of a method of controlling a power state of a remote control device including circuitry configured to receive user input to wirelessly control at least one electronic device. The method may comprise:

determining a state of the at least one electronic device; and controlling a power state of the circuitry of the remote control device based on the determined state of the at least one electronic device. In some embodiments, controlling the power state of the circuitry may comprise placing at least a portion of the circuitry into at least one of a stand-by or an off power state when a corresponding controlled portion of the at least one electronic device is determined to not be in use.

In some embodiments, the circuitry configured to receive user input may include circuitry to wirelessly control a main electronic device and circuitry to wirelessly control at least one auxiliary electronic device. In such embodiments, controlling the power state of the circuitry may comprise controlling a power state of the circuitry to control the main electronic device based on a state of the main electronic device and controlling a power state of the circuitry to control the at least auxiliary electronic device based on a state of the at least one auxiliary electronic device.

In some embodiments, the method may further comprise obtaining information regarding the state of the at least one electronic device by polling the at least one electronic device for information regarding the state of the at least one electronic device. In some embodiments, polling of the at least one electronic device for information regarding the state of the at least one electronic device may be performed at least when at least a portion of the circuitry is in at least one of a stand-by or an off power state. Such polling of the at least one electronic device may be performed periodically. Alternatively or additionally, polling the at least one electronic device may be performed at least when the remote control device is contacted by a user.

DETAILED DESCRIPTION

The following describes various embodiments of systems and methods that may be used to reduce power consumption in a wireless remote control device. Although specific embodiments may be described in detail, the embodiments disclosed should not be interpreted or otherwise used to restrict the scope of the disclosure provided herein. It should be understood that the following description has broad application, and the discussion of specific embodiments is meant only to be exemplary, and is not intended to represent the only embodiments contemplated and encompassed by this disclosure. References to various "circuitry" herein should be understood to include, but not be limited to, wired circuits, traces, integrated circuits, processors, memories, displays, interfaces, and the like that may be employed to receive user input and generate output for controlling an electronic device according to such input, as is well known in the remote control electronics arts.

As discussed above, various systems and methods disclosed herein may control the power state of remote control electronics to reduce power consumption. As wireless remote control devices rely on a limited power supply provided by one or more batteries, reducing power consumption in such remote control devices may prolong use of the remote control devices without battery recharging and/or replacement. This is particularly true for remote control devices that include more circuitry and/or circuitry with relatively large power requirements. For example, remote control devices may include circuitry for controlling a plurality of electronic devices, with or without learning capabilities, and may include more power-intensive features, such as touchpads, displays, pointer circuitry, gyroscopes, accelerometers, etc.

In general, it may be desirable to place one or more portions of the electronics of a remote control into a stand-by (i.e., low-power) or an off power state when such portion(s) is/are not needed. For example, by controlling the power state(s) of portion(s) of the remote control electronics based on the state of the associated device, i.e., the device to be controlled using the portion(s) of the remote control, the power consumption of the remote control device may be reduced or even minimized.

Figure 1:
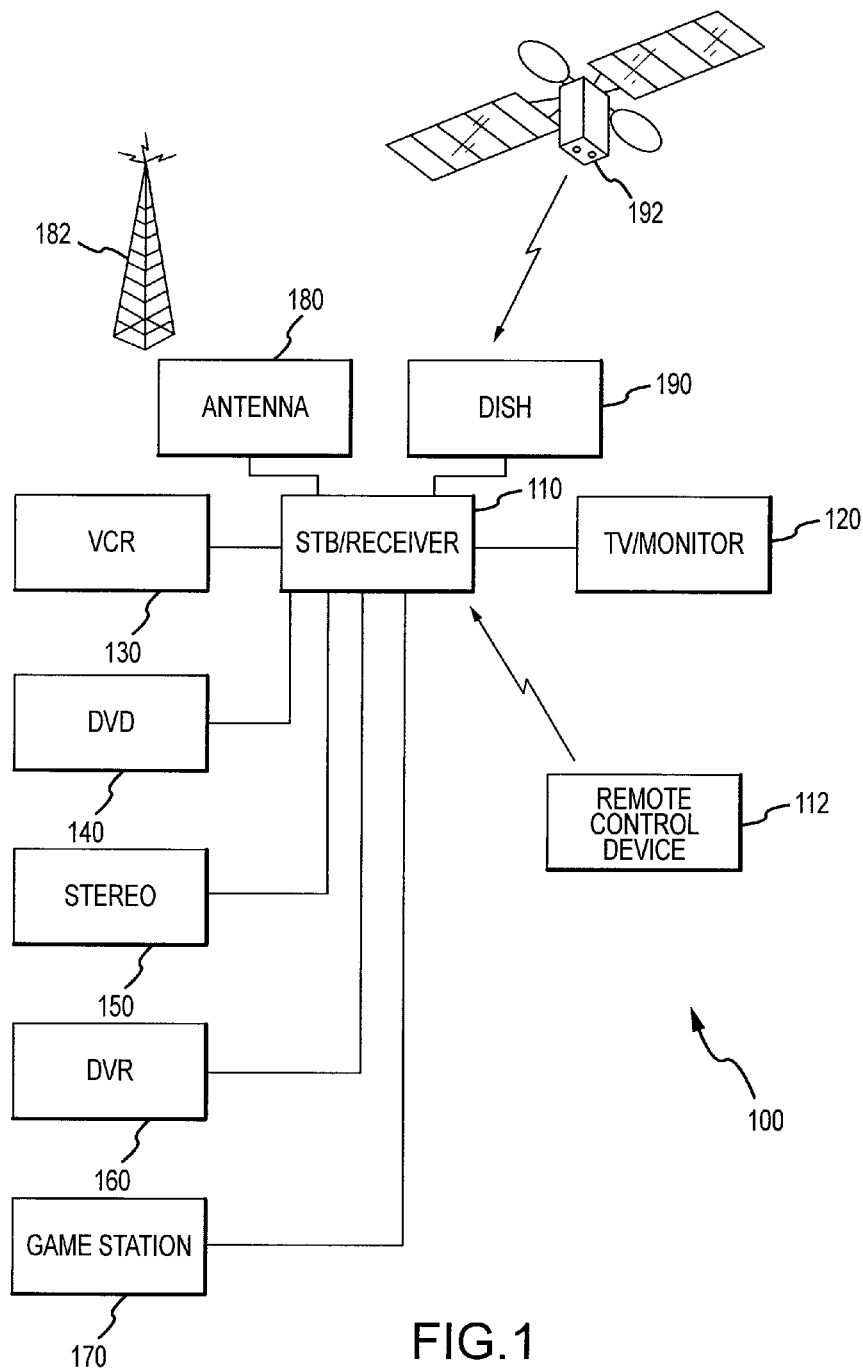
FIG. 1 is a schematic representation of a home entertainment system in which embodiments described herein may be employed.

The systems and methods described herein may be employed, for example, in a home entertainment system 100, as illustrated in FIG. 1. Of course, it should be understood that a home entertainment system and the components thereof are merely examples of electronic devices to which the systems and method described herein may be applied. As such, it should be understood that any electronic device that is controlled wirelessly via a remote control device may benefit from such systems and methods.

As illustrated, the home entertainment system 100 may include a set top box (STB) or receiver 110 as a main electronic device. A remote control device 112 may be configured to wirelessly control the STB/receiver 110, as well as the other components of the home entertainment system 100, as discussed below. The STB/receiver 110 may be configured to operate as a "hub" or central device for interconnecting various other components of the home entertainment system 100. As described herein, this may facilitate determining state information for the various components and providing such information to the remote control device 112.

The STB/receiver 110 may be configured to receive inputs from an antenna 180 (or cable, fiber optics, etc.) and/or a satellite dish 190, which are respectively configured to receive over-air signals from a broadcast source 182 and satellite signals from a satellite source 192. A basic arrangement of the home entertainment system 100 may include the STB/receiver 110, one of the antenna 180 and the satellite dish 190, and a television (TV)/monitor 120. Typically, the antenna 180 and/or the satellite dish 190, and the TV/monitor 120 are coupled to the STB/receiver 110 so that television programs from the broadcast source 182 and/or the satellite source 192 may be displayed on the television monitor 120.

In such an arrangement, the remote control device 112 may be configured to control the STB/receiver 110 as well as the TV/monitor 120. Although not illustrated, it may be envisioned that the STB/receiver 110 is coupled to a plurality of TV/monitors 120, for example, for multiple room arrangements. In such case, a plurality of remote control devices 112 may be employed, each associated with one of the TV/monitors 120.

As illustrated in FIG. 1, additional components of the home entertainment system 100 may include a videocassette recorder (VCR) 130, a digital video disc (DVD) player/recorder 140, a stereo 150, a digital video recorder (DVR), and a game station 170. It should be understood that such electronic devices are only examples, and thus not limiting or exhaustive. Further, although each of these components are illustrated as being coupled to the STB/receiver 110, it should be understood that a different electronic device, such as the game station 170, a processor of the stereo 150, a personal computer, etc. may serve as a main electronic device or central electronic device coupled to the other electronic devices. As described further below, the remote control device 112 may include circuitry configured to control each of the components 130, 140, 150, 160, 170 as auxiliary electronic devices.

Figure 2:
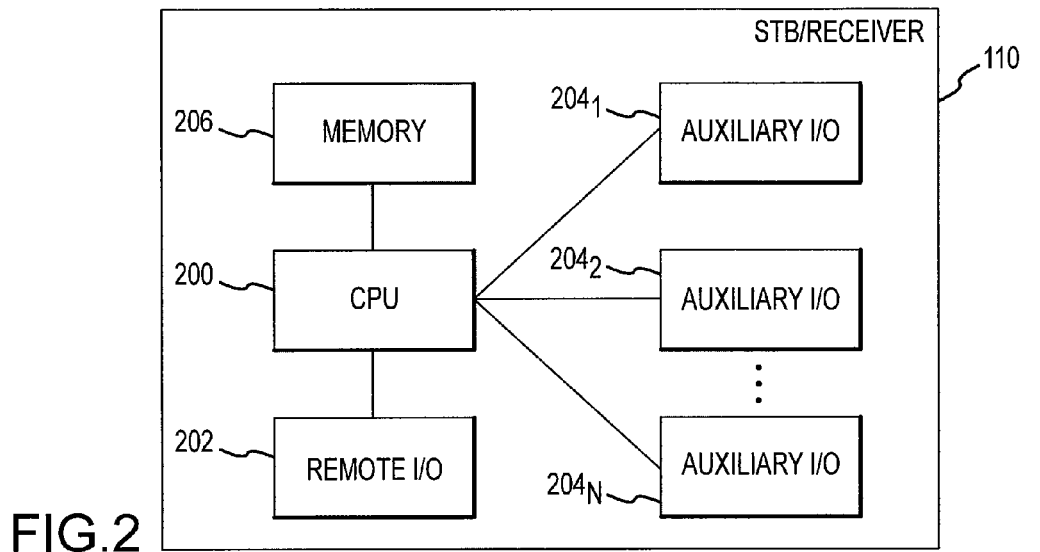
FIG. 2 is a block diagram of a set top box/receiver that may be employed in systems and methods described herein.

In the case of the STB/receiver 110 configured to operate as a main electronic device for interconnecting various other components, one embodiment of the STB/receiver 110 may include features as illustrated in FIG. 2. The STB/receiver 110 may include a processor or central processing unit (CPU) 200 that is coupled to a remote input/output (I/O) device 202 configured to wirelessly communicate with the remote control device 112. It should be understood that the remote I/O device 202 may be one or more devices capable of receiving information from and sending information to the remote control device 112 in any known or hereafter developed manner, such as infrared, radio frequency (RF), etc. Further, it should be understood that the CPU 200 may be the main processor of the STB/receiver 110 that is configured to perform and/or control various operations and functions of the STB/receiver 110 in addition to those discussed herein, or may be a separate processor, for example, dedicated to the operations and functions associated with controlling the power state(s) of the circuitry of the remote control device 112 as described herein.

The CPU 200 may be coupled to one or more auxiliary input/output (I/O) devices $204_1$, $204_2$ through $204_N$ that are configured to provide communications with the various components 120, 130, 140, 150, 160, 170, as discussed herein. Further, the CPU 200 may be coupled to a memory 206 that is configured to store information regarding the STB/receiver 110 and/or the various components coupled thereto.

Figure 3:
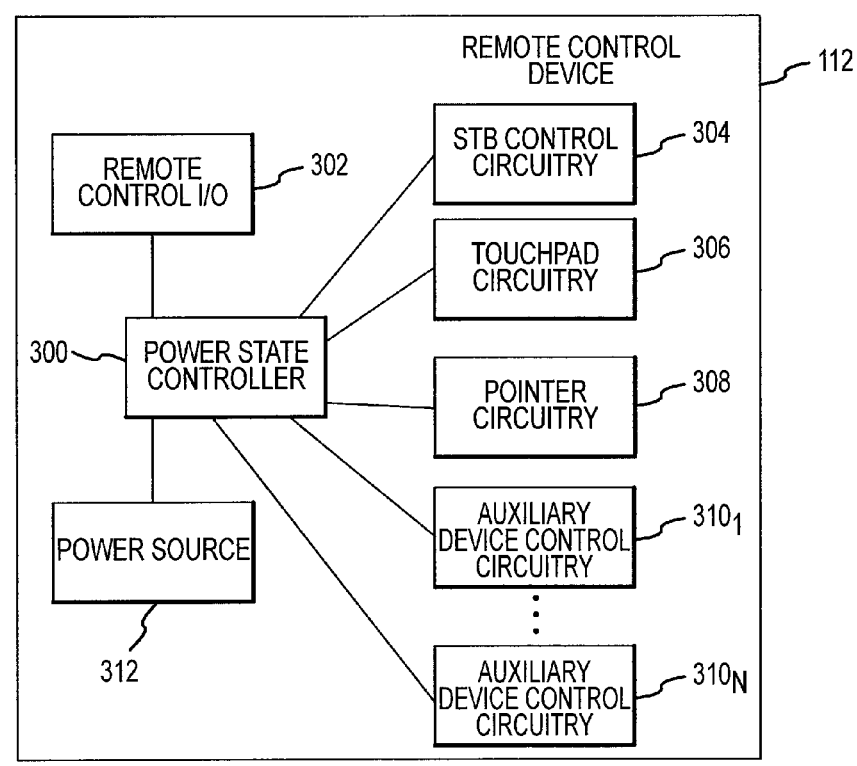
FIG. 3 is a block diagram of a remote control device that may be employed in systems and methods described herein.

In the case of a single remote control device 112, which may be extended as appropriate or desired to arrangements involving multiple remote control devices, one embodiment of the remote control device 112 is illustrated in FIG. 3. The remote control device 112 may include power state controller 300 coupled to a remote control input/output (I/O) device 302 that is configured to wirelessly communicate with the STB/receiver 110. It should be understood that the power state controller 300 may be any suitable controller, processor, circuitry, or the like, that is capable of performing the operations and functions described herein. Further, it should be understood that the remote control I/O device 302 may be one or more devices capable of receiving information from and sending information to the STB/receiver 110 in any known or hereafter developed manner, such as infrared, radio frequency (RF), etc.

The remote control device 112 may further include various circuitry configured to receive user input for controlling various electronic devices and functions thereof. As discussed above, the term circuitry is intended to include features such as touchpads and displays, in addition to wired circuits and integrated circuits. The remote control device 112 may include, for example, STB control circuitry 304, touchpad circuitry 306, and pointer circuitry 308. The STB control circuitry 304 may be configured to receive user input for controlling various functions of the STB/receiver 110. The touchpad circuitry 306 may be an area configured to receive user input via a finger, a stylus, or the like, and may be configured to control one or more electronic devices, as appropriate or desired. The pointer circuitry 308 may be configured to interact with an on-screen menu displayed on the TV/monitor 120, for example, by moving and pointing the remote control device 112 at items of the on-screen menu and/or controlling a cursor thereof.

The remote control device 112 may also include auxiliary device control circuitry $310_1$ through $310_N$ for each of a plurality of auxiliary electronic devices that the remote control device is configured to control, such as the components 120, 130, 140, 150, 160 and/or 170. Each of the auxiliary device control circuitry $310_1$ through $310_N$, STB control circuitry 304, touchpad circuitry 306, and pointer circuitry 308 may be coupled to the power state controller 300. The power state controller 300 is in turn coupled to a power source 312, such as a battery, so that the power state (e.g., on, off, stand-by) of each of the circuitry may be controlled by the power state controller 300.

For example, the CPU 200 of the STB/receiver 110 may determine or otherwise obtain information regarding the state of the STB/receiver 110 and store the state information in the memory 206. The state information may comprise, for example, the STB/receiver 110 being on, the STB/receiver being off (or stand-by), as well as specific features or functions of the STB/receiver 112 being on/active/in use or off/inactive/not in use.

The power state controller 300 of the remote control device 112 may poll or query the STB/receiver 110 via the remote control I/O 302 for information regarding the state of the STB/receiver 112. In response, the CPU 200 of the STB/receiver 110 may send the current state information of the STB/receiver 112 stored in the memory 206 to the remote control device 112 via the remote I/O 202.

Based on the state information received for the STB/receiver 112, the power state controller 300 may set or otherwise control the power state of the STB control circuitry 304, as well as any other circuitry configured to control the STB/receiver 112 or functions thereof, such as the touchpad circuitry 306 and/or the pointer circuitry 308.

For example, when the state information regarding the STB/receiver 112 is that the STB/receiver is off or in a stand-by mode, the power state controller 300 may control or set the power state of the STB control circuitry 304 to off or stand-by, as such circuitry need not be powered and available for receiving user input with the STB/receiver 112 off or in the stand-by mode. The state information regarding the STB/receiver 112 may also be specific to features and/or functions of the STB/receiver 112, such that when a particular feature is off/inactive/not in use, a corresponding portion of the STB control circuitry 304 configured to control that particular feature may be placed in an off or stand-by power state, assuming that such portion is not also used to control another feature that is on/active/in use. For example, if the pointer circuitry 308 is configured only to control/interact with a particular feature, such as the on-screen menu, the pointer circuitry 308 may be placed in an off or stand-by power state when the on-screen menu is not on/active/in use.

The operations of the CPU 200 and the power state controller 300 may be extended similarly to the other electronic devices coupled to the auxiliary I/O devices $204_{1-N}$ and configured to be controlled via the auxiliary device control circuitry $310_{1-N}$. For example, the CPU 200 may obtain state information regarding each auxiliary electronic device via the corresponding auxiliary I/O device $204_{1-N}$ and store such state information in the memory 206. The power state controller 300 may obtain that state information from the STB/receiver 112 and control or set the power state of the corresponding circuitry $310_{1-N}$ or one or more portions thereof based on that state information. As noted above, such state information may be used by the power state controller 300 to control or set the power state of other circuitry as well, such as the touchpad circuitry 306 and/or the pointer circuitry 308 when such circuitry is configured to control one or more functions of the auxiliary devices.

Thus, in general, the power state controller 300 may be configured to control the power state of the various circuitry of the remote control device 112 based on the state information regarding the electronic component and/or function thereof that the circuitry is configured to control. In the case of multiple remote control devices 112 mentioned above, the state information regarding only those electronic devices each of the respective remote control devices are configured to control may be provided to the respective remote control devices.

Figure 4:
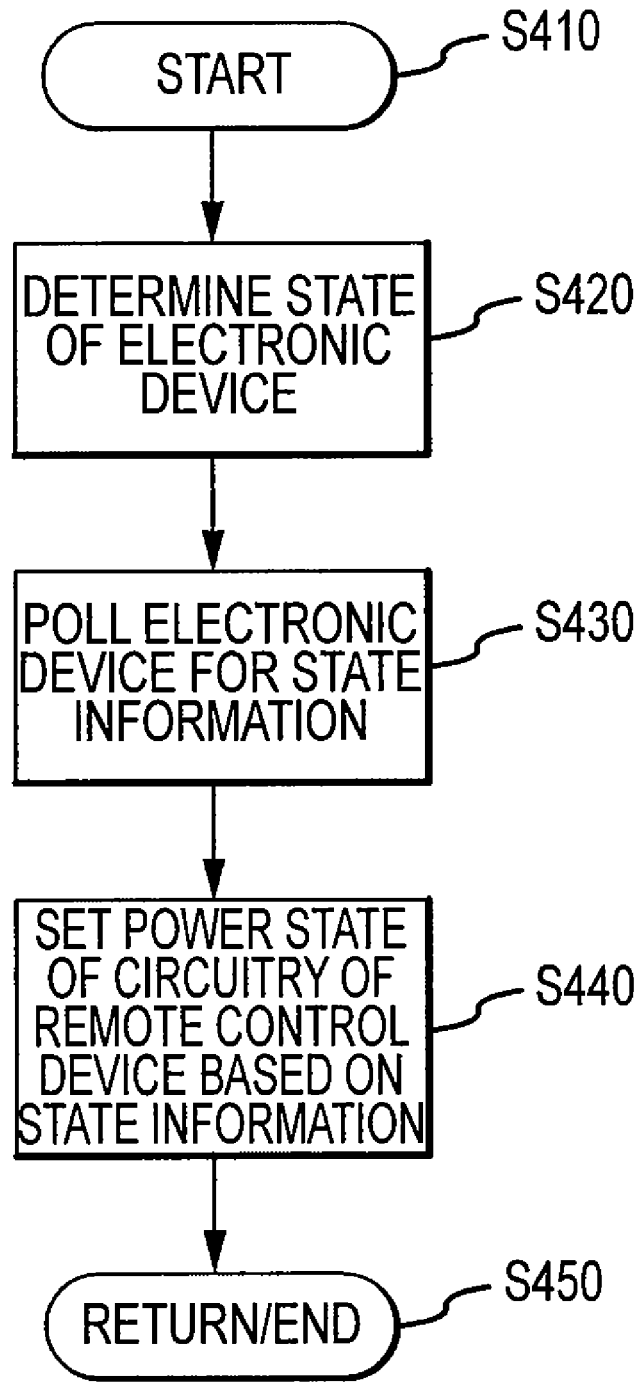
FIG. 4 is a flowchart illustrating a method of controlling a power state of circuitry of a remote control device based on a state of an electronic device controlled by the remote control device.

Although various methods will be apparent based on the foregoing discussion, an example of a method is provided in the flowchart of FIG. 4. The process may begin at S410 and continue to S420, where the current state of the electronic device may be determined. For example, the electronic device, such as an STB, may include firmware that is aware of various states, such as "on" or "off" or whether a menu is being displayed. As discussed above, determining the current state may be for one or more devices, as well as for individual features and/or functions of the device(s).

At S430, the electronic device, such as the STB/receiver discussed above or any other device arranged to operated as a hub/central/main device, may be polled for the state information. Such polling may be periodic, particularly when the remote control device is placed in a stand-by state overall. For example, the power state controller may be itself be placed in an off or stand-by power mode and "wake up" periodically to poll the electronic device. Alternatively or additionally, the remote control device may be configured to poll the electronic device for state information when the remote control device is contacted by a user, for example, by receiving a user input and/or by detecting human contact, such as described in the incorporated copending Application No.

Alternatively or additionally, status information may be communicated via messages in the communication protocol that convey that information to the remote control, for example, in response to command signals from the remote control. For example, if a user presses a "GUIDE" button on the remote control, the STB may display a program guide and may inform the remote control that the "guide is on." When the user makes a program selection, for example, by pressing a "SELECT" or "ENTER" button on the remote control, the STB may tune to the selected channel, remove the program guide from the display, and inform the remote control that the "guide is off."

It should be understood that the STB or other electronic device arranged to operated as a hub/central/main device may communicate with other electronic devices to obtain status information and/or to provide some device control. For example, such communications may be performed using an optional extension to HDMI (high-definition multimedia interface) referred to as CEC (consumer electronic control). Compliant devices may communicate state information using this technology and allow the STB or other "hub" to relay such information to the remote control. In general, state information may be communicated in any suitable manner or communication protocol as supported by the device(s) and the remote control.

Once the state information is received by the remote control device, the power state of circuitry of the remote control device may be set based on such state information at S440. As discussed above, the power state of entire portions of the circuitry for controlling a particular electronic device may be set and/or select portions of the circuitry for controlling a particular electronic device may be set, all based on the state of the corresponding electronic device.

Finally, the process may end at S450 and/or return to S410. As discussed above, the polling of the electronic device may be periodic or otherwise initiated. Similarly, the state information of the electronic device and/or of auxiliary electronic devices coupled thereto may be obtained and updated periodically, as initiated by the remote control device and/or as initiated by a change in the state information of the respective device(s).

It should be understood that the flowchart of FIG. 4 is only an example, and that other methods, whether by addition of operations, omission of operations, and/or reordering of operations, may be envisioned. For example, the flowchart of FIG. 4 does not illustrate various "starting" configurations of the power state(s) of the electronic device(s) or the power state(s) of the circuitry of the remote control device(s) that are possible. Instead, it should be understood that any suitable flow of operations may be determined as appropriate or desired for a given arrangement of electronic devices and remote control device(s) based on the description provided herein.

The foregoing merely illustrates the principles of the invention. Various modifications and alterations to the described embodiments will be apparent to those skilled in the art in view of the teachings herein. It will thus be appreciated that those skilled in the art will be able to devise numerous systems, arrangements and methods which, although not explicitly shown or described herein, embody the principles of the invention and are thus within the spirit and scope of the present invention. From the above description and drawings, it will be understood by those of ordinary skill in the art that the particular embodiments shown and described are for purposes of illustration only and are not intended to limit the scope of the present invention. References to details of particular embodiments are not intended to limit the scope of the invention.

What is claimed is:

1. A remote control device, comprising:
   circuitry configured to receive user input to wirelessly control at least one electronic device;
   a power source electrically coupled to provide power to the circuitry; and
   a power state controller configured to control a power state of the circuitry based on a state of the at least one electronic device, wherein the power state controller is configured to place at least a portion of the circuitry that is operable to control a corresponding portion of the at least one electronic device into at least one of a stand-by or an off power state when the power state controller obtains state information indicating that the corresponding controlled portion of the at least one electronic device is not in use in order to reduce power consumption;
   wherein the circuitry configured to receive user input includes circuitry to wirelessly control a main electronic device and circuitry to wirelessly control at least one auxiliary electronic device and the power state controller is configured to:
   control a power state of the circuitry to control the main electronic device based on a state of the main electronic device;
   control a power state of the circuitry to control the at least one auxiliary electronic device based on a state of the at least one auxiliary electronic device, place at least a portion of the circuitry to control the main electronic device into at least one of a stand-by or an off power state when the power state controller obtains state information indicating that a corresponding controlled portion of the main electronic device is not in use in order to reduce power consumption, and place at least a portion of the circuitry to control the at least one auxiliary electronic device into at least one of a stand-by or an off power state when the power state controller obtains state information indicating that a corresponding controlled portion of the at least one auxiliary electronic device is not in use in order to reduce power consumption.

2. The device of claim 1, wherein the power state controller is configured to obtain information regarding the state of the at least one electronic device by polling the at least one electronic device for information regarding the state of the at least one electronic device.

3. The device of claim 2, wherein the power state controller is configured to poll the at least one electronic device for information regarding the state of the at least one electronic device when at least a portion of the circuitry is in at least one of a stand-by or an off power state.

4. The device of claim 3, wherein the power state controller is configured to poll the at least one electronic device periodically.

5. The device of claim 3, wherein the power state controller is configured to poll the at least one electronic device at least when the remote control device is contacted by a user.

6. A method of controlling a power state of a remote control device including circuitry configured to receive user input to wirelessly control at least one electronic device, the method comprising:

determining a state of the at least one electronic device; and controlling a power state of the circuitry of the remote control device based on the determined state of the at least one electronic device, wherein controlling the power state of the circuitry comprises placing at least a portion of the circuitry that is operable to control a corresponding portion of the at least one electronic device into at least one of a stand-by or an off power state when state information is obtained indicating that the corresponding controlled portion of the at least one electronic device is not in use in order to reduce power consumption wherein the circuitry configured to receive user input includes circuitry to wirelessly control a main electronic device and circuitry to wirelessly control at least one auxiliary electronic device and wherein controlling the power state of the circuitry comprises:

controlling a power state of the circuitry to control the main electronic device based on a state of the main electronic device;

controlling a power state of the circuitry to control the at least auxiliary electronic device based on a state of the at least one auxiliary electronic device;

placing at least a portion of the circuitry to control the main electronic device into at least one of a stand-by or an off power state when a corresponding controlled portion of the main electronic device is not in use; and placing at least a portion of the circuitry to control the at least auxiliary electronic device into at least one of a stand-by or an off power state when a corresponding controlled portion of the at least auxiliary electronic device is not in use.

7. The method of claim 6, further comprising obtaining information regarding the state of the at least one electronic device by polling the at least one electronic device for information regarding the state of the at least one electronic device.

8. The method of claim 7, wherein polling of the at least one electronic device for information regarding the state of the at least one electronic device is performed at least when at least a portion of the circuitry is in at least one of a stand-by or an off power state.

9. The method of claim 8, wherein polling of the at least one electronic device is performed periodically.

10. The method of claim 8, wherein polling the at least one electronic device is performed at least when the remote control device is contacted by a user.

* * * * *

UNITED STATES PATENT AND TRADEMARK OFFICE
CERTIFICATE OF CORRECTION

| | | |
|---|---|---|
| PATENT NO. | : 8,082,455 B2 | Page 1 of 1 |
| APPLICATION NO. | : 12/056520 | |
| DATED | : December 20, 2011 | |
| INVENTOR(S) | : William R. Reams | |

It is certified that error appears in the above-identified patent and that said Letters Patent is hereby corrected as shown below:

On the Title Page

Item (56):
"International Search Report dated July 20, 2009, PCT/US2009/037856, 2 pages. Osoinach, Bryce, "Proximity Capacitive Sensor Technology for Touch Sensing Applications," Proximity Sensing White Paper prepared for Freescale Semiconductor, Inc., Tempe, Arizona, 2007, 12 pages." Should read,
--International Search Report dated July 20, 2009, PCT/US2009/037856, 2 pages. Osoinach, Bryce, "Proximity Capacitive Sensor Technology for Touch Sensing Applications," Proximity Sensing White Paper prepared for Freescale Semiconductor, Inc., Tempe, Arizona, 2007, 12 pages.--.

In the Specifications:

Column 10, Line 5:
"consumption" Should read, --consumption;--.

Signed and Sealed this
Fourteenth Day of May, 2013

Teresa Stanek Rea
*Acting Director of the United States Patent and Trademark Office*